US012631153B2

(12) United States Patent
Darley et al.

(10) Patent No.: US 12,631,153 B2
(45) Date of Patent: May 19, 2026

(54) DIAGNOSING AND REMEDIATING FUEL INJECTION DRIFT UTILIZING FUEL RAIL PRESSURE MEASUREMENTS

(71) Applicant: Perkins Engines Company Limited, Peterborough (GB)

(72) Inventors: James Darley, Peterborough (GB); John Calcraft, Peterborough (GB); Stuart Edwards, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/646,149

(22) Filed: Apr. 25, 2024

(65) Prior Publication Data

US 2024/0360800 A1 Oct. 31, 2024

(30) Foreign Application Priority Data

Apr. 25, 2023 (GB) ..................................... 2306065

(51) Int. Cl.
*F02D 41/40* (2006.01)

(52) U.S. Cl.
CPC .... *F02D 41/402* (2013.01); *F02D 2200/0602* (2013.01)

(58) Field of Classification Search
CPC ..... F02D 2200/0602; F02D 2200/0616; F02D 2200/0614; F02D 41/402
See application file for complete search history.

(56) References Cited

U.S. PATENT DOCUMENTS 4,140,088 A 2/1979 de Vulpillieres
6,189,378 B1 2/2001 Kendrick et al.
(Continued)

FOREIGN PATENT DOCUMENTS

DE 102012102907 10/2012
DE 102013223756 B4 8/2015
(Continued)

OTHER PUBLICATIONS

European Search Report for EP Patent Appln. No. 24171913.7, mailed Oct. 11, 2024 (3 pgs).
(Continued)

*Primary Examiner* — Gonzalo Laguarda

(57) ABSTRACT

A fuel injection system for an internal combustion engine is provided. The fuel injection system comprises a primary fuel injector, a sensor, at least one secondary fuel injector and a controller. The primary fuel injector is configured to inject fuel into an ignition chamber of the internal combustion engine. The sensor is coupled to the primary fuel injector, wherein the sensor is configured to sense a fuel pressure of the fuel being injected by the primary fuel injector throughout each injection cycle of the primary fuel injector. The at least one secondary fuel injector is configured to inject fuel into a respective ignition chamber of the internal combustion engine. The controller is configured to receive data indicative of the fuel pressure value throughout each injection cycle. The controller is configured to determine a fuel quantity drift parameter over a plurality of fuel injection cycles based on the data indicative of the fuel pressure value. The controller is configured to adjust a fuel quantity delivered by the primary fuel injector and each secondary fuel injector based on the fuel quantity drift parameter.

17 Claims, 7 Drawing Sheets

(56) References Cited

U.S. PATENT DOCUMENTS

| | | | | |
|---|---|---|---|---|
| 6,363,314 | B1 | 3/2002 | Hafner et al. | |
| 6,480,781 | B1 | 11/2002 | Hafner et al. | |
| 6,588,398 | B1 | 7/2003 | Rodier | |
| 6,848,414 | B2 | 2/2005 | West et al. | |
| 6,850,835 | B1 | 2/2005 | Barnes et al. | |
| 6,964,261 | B2 | 11/2005 | Warne et al. | |
| 7,873,460 | B2 * | 1/2011 | Nakata | F02D 41/222<br>123/457 |
| 8,215,161 | B2 * | 7/2012 | Yamada | F02D 41/22<br>73/114.51 |
| 10,344,698 | B2 * | 7/2019 | Barth | F02D 41/2464 |
| 11,215,134 | B2 * | 1/2022 | Petitjean | F02D 41/40 |
| 12,146,449 | B2 * | 11/2024 | Borate | F02D 41/3845 |

FOREIGN PATENT DOCUMENTS

| | | | |
|---|---|---|---|
| EP | 1959118 | A2 | 8/2008 |
| GB | 2404746 | A | 2/2005 |
| KR | 102010614 | B1 | 8/2019 |

OTHER PUBLICATIONS

Great Britain search report related to Application No. GB2306065.0; reported on Oct. 18, 2023.

* cited by examiner

DIAGNOSING AND REMEDIATING FUEL INJECTION DRIFT UTILIZING FUEL RAIL PRESSURE MEASUREMENTS

CROSS-REFERENCE TO RELATED APPLICATION

This application claims priority under 35 USC § 119 and the Paris Convention to Great Britain Patent Application No. 2306065.0 filed on Apr. 25, 2023.

FIELD OF THE DISCLOSURE

The present disclosure relates to an internal combustion engine. In particular, the present invention relates to an internal combustion engine comprising a plurality of fuel injectors.

BACKGROUND

An internal combustion engine, for example a diesel engine, comprises a plurality of fuel injectors. In a diesel engine for example, each fuel injector is configured to inject a specific quantity of fuel into a combustion chamber, or pre-chamber of the internal combustion engine.

In some cases, each fuel injector performs a single fuel injection event per engine cycle, often known as single shot injection. It is also known to perform a plurality of injection events per engine cycle, often referred to as multi-shot injection. In each case, the timing of the fuel injection event(s) within the engine cycle, as well as the quantity of fuel injected affects the outputs (e.g. torque, emissions, heat etc.) of the internal combustion engine.

U.S. Pat. No. 6,964,261 B discloses a method of adaptive fuel injector trimming. According to the method a fuel shot is injected during a zero fuel condition. A rail pressure drop corresponding to the fuel shot is determined. A change in engine speed corresponding to the fuel shot is determined. An adjustment to the fuel injection as a function of the rail pressure drop and the corresponding change in engine speed is determined.

Against this background, an improved, or at least commercially relevant alternative, fuel injection system and method is provided.

SUMMARY OF THE DISCLOSURE

According to a first aspect of the disclosure a fuel injection system for an internal combustion engine is provided. The fuel injection system comprises a primary fuel injector, a sensor, at least one secondary fuel injector and a controller. The primary fuel injector is configured to inject fuel into an ignition chamber of the internal combustion engine. The sensor is coupled to the primary fuel injector, wherein the sensor is configured to sense a fuel pressure of the fuel being injected by the primary fuel injector throughout each injection cycle of the primary fuel injector. The at least one secondary fuel injector is configured to inject fuel into a respective ignition chamber of the internal combustion engine. The controller is configured to receive data indicative of the fuel pressure value throughout each injection cycle. The controller is configured to determine a fuel quantity drift parameter over a plurality of fuel injection cycles based on the data indicative of the fuel pressure value. The controller is configured to adjust a fuel quantity delivered by the primary fuel injector and each secondary fuel injector based on the fuel quantity drift parameter.

The present inventors have realised that over time the fuel quantity injected by fuel injectors are prone to drift. For example, in some cases the fuel quantity delivered over time may decrease due to e.g. coking of the fuel injector. In some circumstances, the fuel quantity delivered over time may increase due to e.g. wear of the fuel injectors. Long-term injector fuel quantity drift may have an adverse effect on one or more of the internal combustion engine characteristics, e.g. performance, durability, and emissions.

Thus, according to the first aspect, the fuel quantity delivered by each of the primary and secondary fuel injectors may be adjusted over time in order to compensate for any drift in the fuel injectors. The present inventors have realised that in order to accurately detect drift in the fuel injectors, it is important to have a sensor which is configured to detect a pressure of the fuel being injected by the fuel injector during the fuel injection cycle. It will be appreciated that providing each fuel injector of an internal combustion engine with one or more dedicated sensors increases the cost and complexity of the fuel injection system. Furthermore, the inventors have realised that the long-term drift of the fuel injectors of an internal combustion engine generally follow a similar trend. In view of this, the fuel injection system of the first aspect utilises a sensor which is coupled to a primary fuel injector, while the secondary fuel injectors may not be provided with a sensor. As such, the fuel injection system of the first aspect provides additional sensing functionality on one fuel injector in order to determine a fuel drift parameter for all of the fuel injectors of the fuel injection system.

According to this disclosure, it will be understood that a primary fuel injector is understood to be a fuel injector which has a sensor coupled to it, wherein the sensor data is used to control both the primary and secondary fuel injectors. As such, in some embodiments, the primary and secondary fuel injectors may be the same type of fuel injector. In some embodiments, the primary fuel injector may include additional sensors such that the primary fuel injector is different to the secondary fuel injectors.

The primary and secondary fuel injectors are each configured to inject fuel into an ignition chamber of the internal combustion engine. In some embodiments, the fuel injectors may be provided as part of a direct injection internal combustion engine. In other embodiments, the primary and secondary fuel injectors are each configured to inject fuel into an ignition chamber, which may be a pre-combustion chamber of an (indirect) internal combustion engine.

According to the first aspect, the sensor is configured to sense a fuel pressure of the fuel being injected by the primary fuel injector throughout each injection cycle of the primary fuel injector. As such, the sensor may be configured to sense a fuel pressure of the fuel being injected by the primary fuel injector before, during, and/or after each injection of fuel (each injection event). For example, the sensor may be configured to sense the fuel pressure at regular intervals during each injection cycle.

In some embodiments, the controller is configured to adjust a fuel quantity delivered by the primary fuel injector and each secondary injector by adjusting an energisation period for each fuel injector based on the fuel quantity drift parameter. Thus, by adjusting the period each fuel injector is energised for, the controller may compensate for any drift over time in the fuel quantity delivered by each of the primary and secondary fuel injectors.

In some embodiments, the controller is configured to adjust a fuel quantity delivered by the primary fuel injector and each secondary injector by adjusting a start of injection timing and/or an end of injection timing for each fuel injector based on the fuel quantity drift parameter. As such, in some embodiments, the controller may adjust the period each of the fuel injectors are energised for in order by adjusting the start of injection timing and/or the end of injection timing for each of the fuel injectors. In addition to, or as an alternative, the controller may shift the start of injection timing and the end of injection timing for each engine cycle (i.e. without changing the energisation period). Changing the injection timing while maintaining/changing a desired fuel quantity delivered may allow the internal combustion engine to operate with desired internal combustion engine characteristics, e.g. performance, durability, and emissions.

In some embodiments, the sensor is integrated with the primary fuel injector. As such, the primary fuel injector may be a "smart fuel injector" comprising one or more sensors configured to output data representative of the performance of the primary fuel injector. Such data may be used by the fuel injection system to compensate for the drift of all fuel injectors of the fuel injection system (including secondary fuel injectors which may not incorporate said sensors).

In some embodiments, the primary fuel injector is connected to a fuel rail of the internal combustion engine by a fuel pipe, wherein the sensor is configured to sense a fuel pressure of the fuel in the fuel pipe. As such, the sensor may be configured to infer the fuel pressure in the primary fuel injector from the fuel pressure in the fuel pipe which draws fuel from the (common) fuel rail of the internal combustion engine. It will be appreciated that the sensor is connected to the fuel pipe, rather than the common fuel rail, in order to detect relatively small changes in the injector by measuring fuel pressure proximal to the fuel injector. Further, the fuel pressure in the fuel pipe may not be affected by the noise associated with changes in fuel pressure found in the common fuel rail of an internal combustion engine.

In some embodiments, the fuel injection system comprises a first secondary fuel injector and a second secondary fuel injector. In some embodiments, the controller is configured to: adjust a fuel quantity delivered by the first secondary fuel injector based on the fuel quantity drift parameter and a first weight associated with the first secondary fuel injector, and to adjust a fuel quantity delivered by the second secondary fuel injector based on the fuel quantity drift parameter and a second weight associated with the first secondary fuel injector. As such, in some embodiments where it is known that different secondary fuel injectors drift at different rates (e.g. due to different engine positions, or different fuel injector characteristics), a weight may be associated with each secondary injector in order to adapt the fuel quantity drift parameter to compensate for the expected drift of each secondary fuel injector. As such, the fuel injection system may utilise weights for each of the fuel injectors in order to use a single fuel quantity drift parameter to trim each of the primary and secondary fuel injectors.

In some embodiments, the fuel injection system further comprises a cylinder sensor coupled to a cylinder of the internal combustion engine associated with the primary fuel injector, the cylinder sensor configured to sense a cylinder pressure and/or combustion timing of the cylinder. In some embodiments, the controller is configured to receive data indicative of the cylinder pressure and/or combustion timing, and to determine a fuel quantity drift parameter over a plurality of fuel injection cycles based on the data indicative of the fuel pressure value and the data indicative of the cylinder pressure and/or combustion timing. As such, the controller may also use data indicative of the cylinder pressure and/or combustion timing to determine the fuel quantity drift parameter. By providing the controller with additional data which is indicative of the combustion cycle of the internal combustion engine, the controller may more accurately detect any changes in the operation of the primary fuel injector, and therefore determine a more accurate fuel quantity drift parameter.

In some embodiments, the controller is configured to determine a fuel quantity drift parameter over a plurality of fuel injection cycles by determining a pressure drop in the fuel pressure value for each injection cycle, wherein the fuel quantity drift parameter is determined based on a change in the pressure drop over a plurality of injection cycles. For example, the controller may perform a moving average calculation to determine the fuel quantity drift parameter.

In some embodiments, the controller is configured to cause the primary fuel injector and the at least one secondary fuel injector to perform a plurality of fuel injection cycles per cycle of the internal combustion engine. As such, the fuel injection system may be a multi-shot fuel injection system. In some embodiments, the controller may be configured to adjust a fuel quantity delivered by the primary and secondary fuel injectors based on the fuel quantity drift parameter and a first weight associated with the first fuel injection cycle; and to adjust a fuel quantity delivered by the primary and secondary fuel injectors based on the fuel quantity drift parameter and a second weight associated with the second fuel injection cycle. As such, the controller may be configured to provide different amounts of compensation for different fuel injections of a multi-shot fuel injection system.

In some embodiments, the fuel injection system may be a single-shot fuel injection system.

According to a second aspect of the disclosure, a kit of parts for a fuel injection system of an internal combustion engine a primary fuel injector and at least one secondary fuel injector is provided. The kit of parts comprises a sensor and a controller. The sensor is configured to be coupled to a primary fuel injector of the internal combustion engine, the sensor configured to sense a fuel pressure of the fuel injected by the primary fuel injector throughout each injection cycle of the primary fuel injector. The controller is for controlling the fuel injection system, wherein the controller is configured to:

- receive data indicative of the fuel pressure value throughout each injection cycle;
- determine a fuel quantity drift parameter over a plurality of fuel injection cycles based on the data indicative of the fuel pressure value; and
- adjust a fuel quantity delivered by the primary fuel injector and each secondary fuel injector based on the fuel quantity drift parameter.

As such, the kit of parts of the second aspect provides a sensor and a controller which can be fitted to a fuel injection system of an internal combustion engine in order to provide a fuel injection system according to the first aspect of the disclosure. As such, the kit of parts of the second aspect allows a pre-existing fuel injection system to be retrofitted in accordance with the first aspect of the disclosure.

In some embodiments, the sensor is provided as part of a primary fuel injector for the internal combustion engine, or as part of fuel pipe configured to supply fuel to the primary fuel injector of the internal combustion engine.

According to a third aspect of the disclosure, a method of controlling a fuel injection system of an internal combustion engine is provided. The method comprises:

- injecting fuel into an ignition chamber of the internal combustion engine using a primary fuel injector, wherein a sensor coupled to the primary fuel injector senses a fuel pressure of the fuel being injected by the primary fuel injector throughout each injection cycle of the primary fuel injector;

injecting fuel into a respective ignition chamber of the internal combustion engine using at least one secondary fuel injector;

receiving data at a controller, the data indicative of the fuel pressure value throughout each injection cycle from the sensor;

wherein the controller determines a fuel quantity drift parameter over a plurality of fuel injection cycles based on the data indicative of the fuel pressure value, and adjusts a fuel quantity delivered by the primary fuel injector and each secondary fuel injector based on the fuel quantity drift parameter.

As such, the method of the third aspect may be performed by the fuel injection system of the first aspect and/or the kit of parts of the second aspect when installed on a fuel injection system.

According to a fourth aspect of the disclosure, a computer program product configured to cause the fuel injection system the first aspect, or the kit of parts of the second aspect when installed on an internal combustion engine, to perform the method of the third aspect is provided.

According to a fifth aspect of the disclosure, a computer-readable storage medium having the computer program of the fourth aspect thereon is provided.

It will be appreciated that the optional features of the first aspect and any associated advantages may be combined with any of the second, third, fourth, and fifth aspects of the disclosure.

BRIEF DESCRIPTION OF THE DRAWINGS

Embodiments of the disclosure will be described with reference to the following non-limiting figures in which.

DETAILED DESCRIPTION

Figure 1:
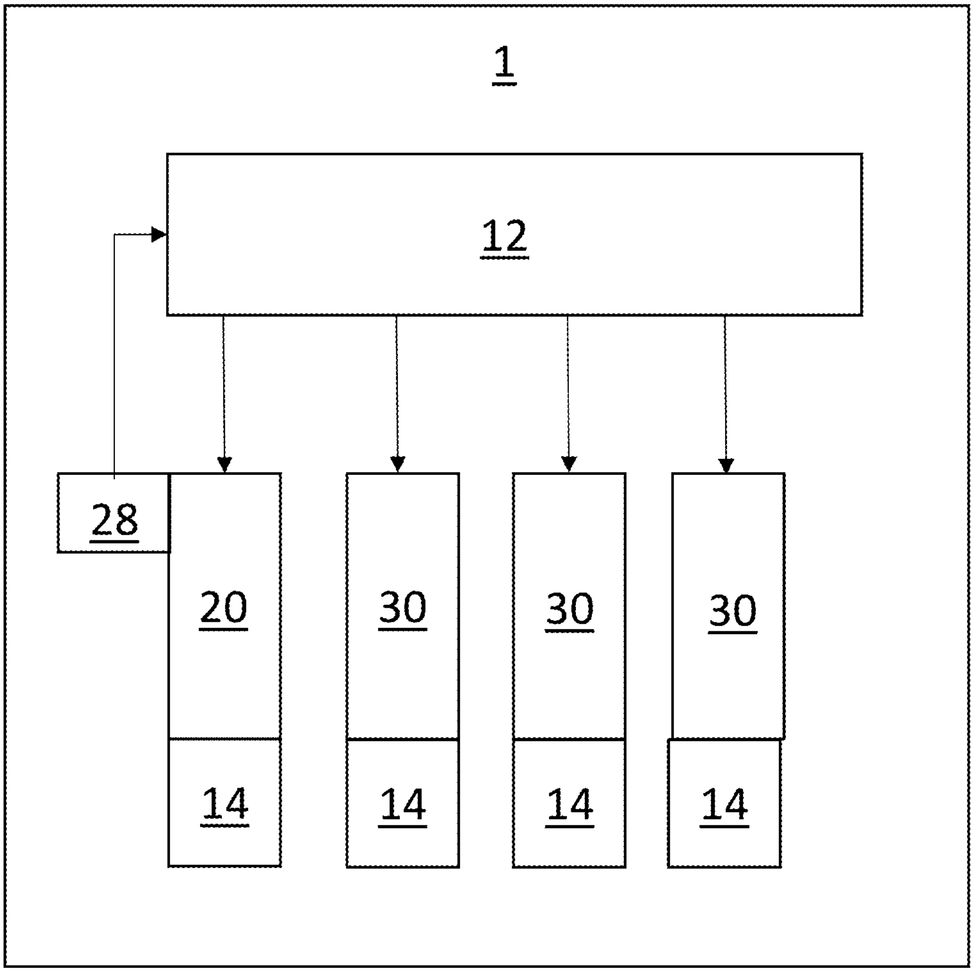
FIG. 1 is a block diagram of a fuel injection system of an internal combustion engine according to an embodiment of the disclosure.

According to an embodiment of the disclosure, an internal combustion engine 1 is provided. The internal combustion engine 1 comprises a fuel injection system 10. The fuel injection system 10 comprises a controller 12, a plurality of combustion chambers 14, a primary fuel injector 20 and a plurality of secondary fuel injectors 30. A schematic block diagram of the internal combustion engine 1 is shown in FIG. 1.

The internal combustion engine 1 of FIG. 1 may be a direct-injection internal combustion engine 1. As shown in FIG. 1, the primary fuel injector 20 and each of the plurality of secondary fuel injectors 30 are configured to inject fuel into a respective combustion chamber 14. In the embodiment of FIG. 1, three secondary fuel injectors 30, such that the internal combustion engine comprises a total of four fuel injectors (and four associated combustion chambers 14. In other embodiments, a different number of fuel injectors 20, 30 may be provided. In some embodiments, each combustion chamber 14 may be provided with a plurality of fuel injectors 20, 30. In some embodiments, only one of the fuel injectors 20, 30 is the primary fuel injector 20 as described further below.

Figure 2:
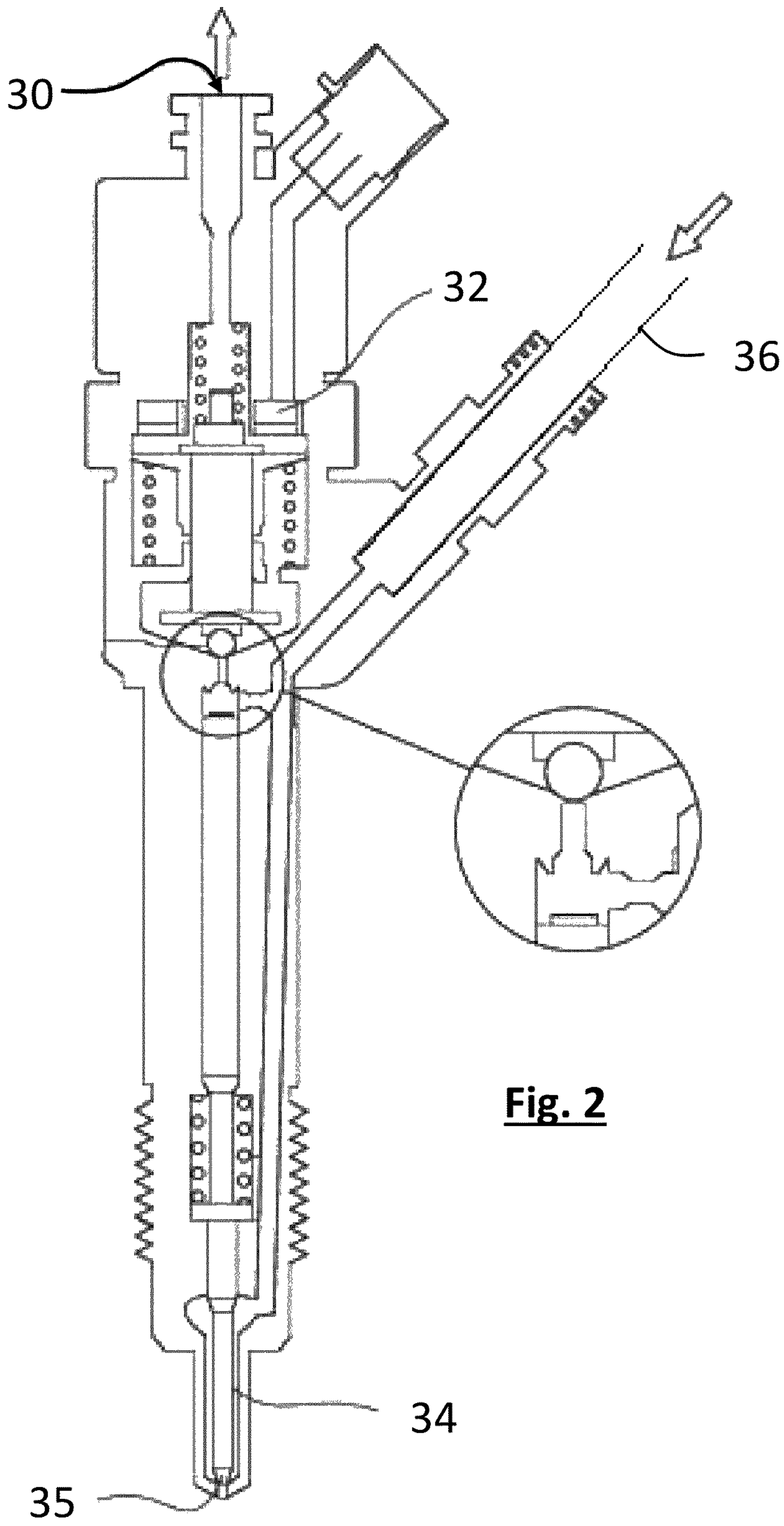
FIG. 2 is a schematic cross-sectional diagram of a secondary fuel injector according to an embodiment of the disclosure.

FIG. 2 is a is a schematic cross-sectional diagram of a secondary fuel injector 30 for the embodiment of FIG. 1. The secondary fuel injector 30 of FIG. 2 is a solenoid fuel injector. As shown in FIG. 2, the secondary fuel injector 30 comprises a solenoid 32 which is configured to actuate the secondary fuel injector (i.e. to cause the secondary fuel injector 30 to inject fuel into the associated combustion chamber 14).

The operation of the solenoid 32, and thus the secondary fuel injector 30 is controlled by the controller 12. The controller 12 is configured to control the secondary fuel injector 30 to inject fuel into the combustion chamber 14 of the internal combustion engine 1. In order to inject fuel, the controller 12 outputs a signal to cause the solenoid 32 to energise, thereby opening the fuel injection valve 34 (typically a needle) to allow fuel to flow through the fuel injection outlet 35 (nozzle). The fuel to be injected is supplied to the secondary fuel injector 30 from a secondary fuel pipe 36. The secondary fuel pipe 36 is connected to a common rail supply of fuel (not shown) which is pressurised. Typically, the common rail supply of fuel is at a pressure of about 200 MPa. For a given pressure of the common rail supply of fuel, the amount of fuel injected by the secondary fuel injector 30 is controlled (primarily) by the time the fuel injection valve 34 is open (the injection time). As such, the controller 12 may control the amount of fuel injected into by controlling the injection time of the secondary fuel injector 30.

It will be appreciated that the secondary fuel injector 30 shown in FIG. 2 is one example of a secondary fuel injector 30 that may be controlled by the controller 12. The skilled person will appreciate that other fuel injectors known in the art may be equally suitable for use with the controller 12 of the present disclosure. The design and operation of fuel injectors, including solenoid fuel injectors is well known, and so not discussed in further detail herein.

Figure 3:
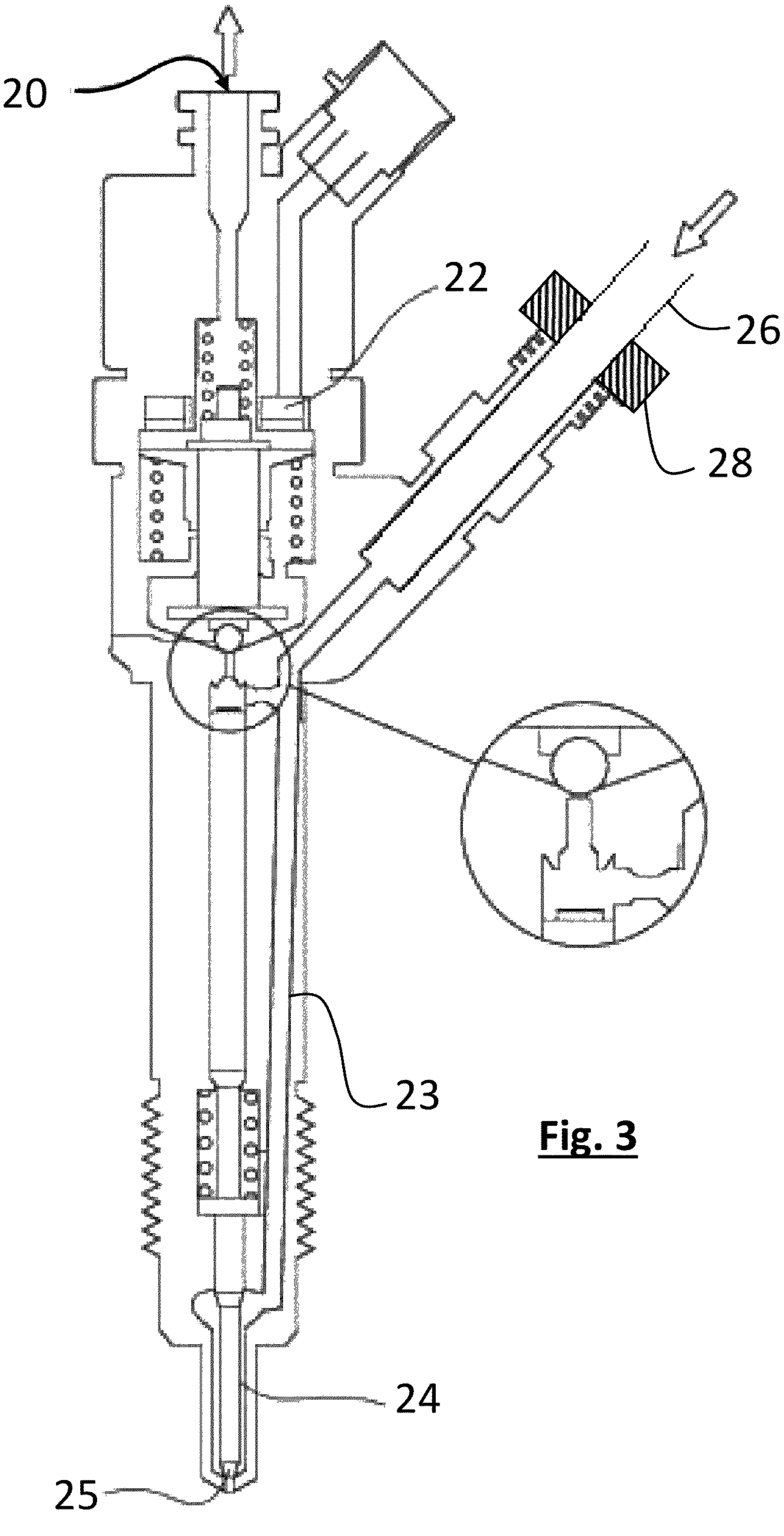
FIG. 3 is a schematic cross-sectional diagram of a primary fuel injector according to an embodiment of the disclosure.

FIG. 3 is a schematic cross-sectional diagram of a primary fuel injector 20 according to this disclosure. The primary fuel injector 20 is similar in construction to the secondary fuel injectors 30 in that it comprises a solenoid 22, a fuel injection valve 24 and a fuel injection outlet 25, and is configured to receive fuel from a primary fuel pipe 26. As shown in FIG. 3, a sensor 28 is connected to the primary fuel pipe 26. As such, the sensor 28 is coupled to the primary fuel injector 20 via the primary fuel pipe 26. For example, in some embodiments a fuel pressure transducer may be connected to the primary fuel pipe 26 by a saddle fixing. The sensor 28 is configured to sense a fuel pressure of the fuel being injected by the primary fuel injector 20 throughout each injection cycle of the primary fuel injector 20. Specifically, the primary fuel injector 20 is configured to sense a fuel pressure of the fuel in the primary fuel pipe 26, which is representative of the fuel pressure of the fuel being injected by the primary fuel injector 20 throughout each injection cycle of the primary fuel injector 20.

In other embodiments (not shown) the sensor may be provided as part of the primary fuel injector 20. For example, in some embodiments a primary fuel injector may comprise an integrated pressure sensor (not shown). The integrated pressure sensor may be configured to sense the pressure of the fuel in the primary fuel injector 20. For example, the primary fuel injector 20 may comprise a main passage 23 configured to direct fuel from the primary fuel pipe 26 to the fuel injection outlet 25. A branch passage (not shown) may be provided off the main passage 23, wherein the integrated pressure sensor may be provided at the end of the branch passage. Accordingly, in use, the fuel pressure at the end of the branch passage may reflect the pressure of the fuel in the primary fuel injector, which is in turn may be detected by the integrated pressure sensor.

The controller 12 may be any suitable controller 12 for controlling the operation of a plurality of fuel injectors 20, 30. For example, the controller 12 may comprise a computer or a microprocessor. In some embodiments, the controller 12 may be an engine control unit or similar control device configured to control one or more actuators of the internal combustion engine 1.

Figure 4:
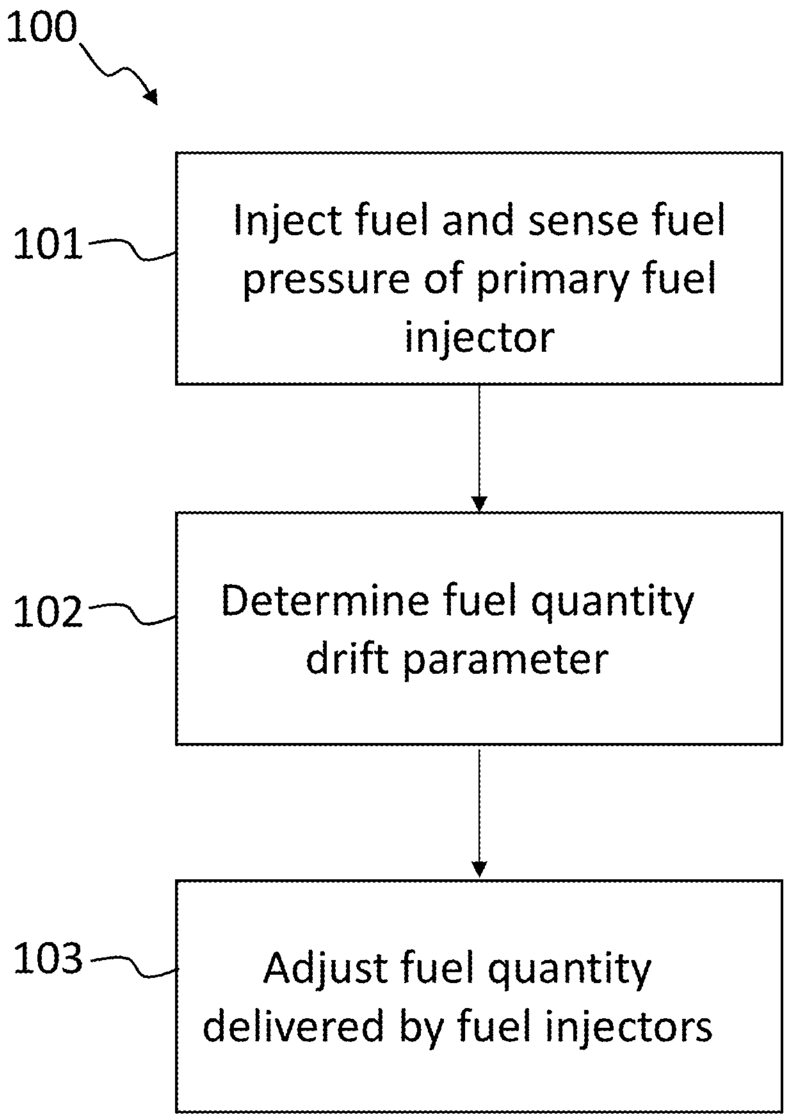
FIG. 4 is a block diagram of a method according to an embodiment of the disclosure.

Next, a method 100 of controlling a fuel injection system of an internal combustion engine will be described with reference to FIG. 4. FIG. 4 is a block diagram of a method 100 according to an embodiment of the disclosure. The method 100 will be described with reference to the internal combustion engine 1 discussed above, but it will be appreciated that the method 100 may be performed by any suitable internal combustion engine 1 according to this disclosure.

Step 101 of the method comprises injecting fuel into the ignition chamber 14 of the internal combustion engine using the primary fuel injector 20. As such, step 101 comprises performing at least one fuel injection cycle using the primary fuel injector 20. During the fuel injection cycle the sensor 28 coupled to the primary fuel injector 20 senses a fuel pressure of the fuel being injected by the primary fuel injector 20. The sensor 28 transmits the data indicative of the fuel pressure during the injection cycle to the controller 12.

The controller 12 receives the data indicative of the fuel pressure of the primary injection valve 20. In some embodiments, the controller 12 may receive the data in real time, wherein the data is processed by the controller 12.

In step 102 of the method, the controller 12 determines a fuel quantity drift parameter. The controller determines the fuel quantity drift parameter over a plurality of fuel injection cycles based on the data indicative of the fuel pressure value.

For example, in some embodiments the controller 12 may be configured to determine a fuel quantity drift parameter over a plurality of fuel injection cycles by determining a pressure drop in the fuel pressure value for each injection cycle. As such, the fuel quantity drift parameter may be determined based on a change in the pressure drop over a plurality of injection cycles.

Figure 5:
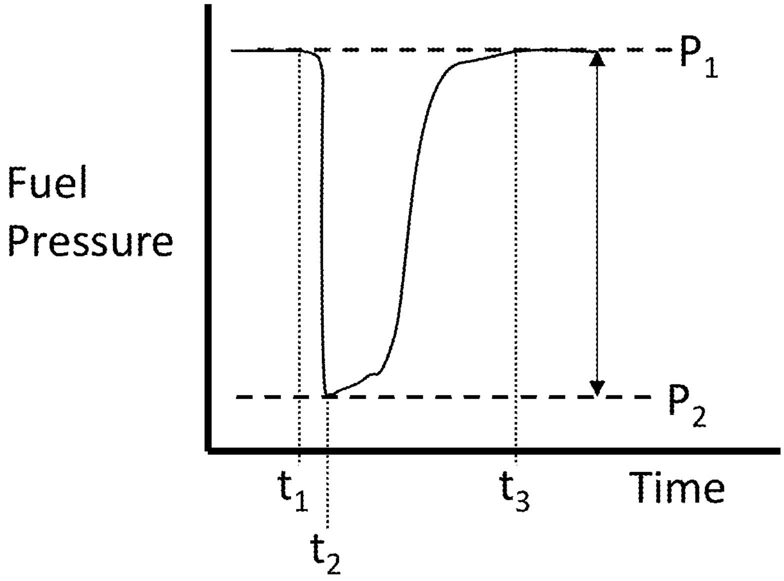
FIG. 5 is a graph showing a variation in fuel pressure for a primary fuel injector over an injection cycle.

By way of example, FIG. 5 shows an example of a variation in the fuel pressure value which may be obtained by sensor 28 over the duration of an injection cycle of the primary fuel injector 20. As shown in FIG. 5, a pressure drop may be determined based on a difference between a fuel pressure $P_1$ when the primary fuel injector is closed and a fuel pressure $P_2$ when the primary fuel injector is injecting fuel. As shown in the embodiment of FIG. 5, the fuel pressure when the primary fuel injector is injecting fuel $P_2$ may be based on a minimum fuel pressure for the injection cycle. It will be appreciated that the pressure drop ($P_1$-$P_2$) may be indicative of the amount of fuel delivered over the injection period. In particular, the pressure drop may be indicative of any coking, wear, or other obstruction of the primary fuel injector 20 which may affect the fuel quantity injected over the injection period.

In some embodiments, the controller 12 may be configured to determine a fuel quantity drift parameter over a plurality of fuel injection cycles by determining a time period associated with each injection cycle. For example, the controller 12 may be configured to determine a time period to reach minimum fuel pressure ($P_2$) from the start of injection (e.g. $t_2-t_1$ as shown in FIG. 5), or a time period for the fuel pressure to recover from minimum pressure ($P_2$) to the fuel pressure when the primary fuel injector is closed ($P_1$) (e.g. $t_3-t_2$ as shown in FIG. 5). Other time periods associated with the change in fuel pressure over a fuel injection cycle may also provide information regarding the drift of the primary fuel injector 20. As such, changes in one or more of these time periods may be indicative of drift in the fuel injector.

In some embodiments, the fuel quantity drift parameter may be determined based on time period data and pressure drop data ($P_1$-$P_2$) for a plurality of injection cycles.

Thus, in some embodiments, the fuel pressure drop may be used to determine a fuel quantity drift parameter for the primary fuel injector 20.

In some embodiments, it will be appreciated that the fuel quantity drift parameter may be a parameter which changes over a relatively long time period (i.e. over many injection cycles). As such, in some embodiments, the fuel quantity drift parameter may be calculated based the pressure drop calculated from a plurality of injection cycles. For example, in some embodiments, the fuel quantity drift parameter may be calculated based on a moving average of the pressure drop from a plurality of injection cycles. For example, the fuel quantity drift parameter may be calculated based on data from the previous at least: 10, 1000, 100,000, or 1,000,000 injection cycles. In some embodiments, the fuel quantity drift parameter may be updated on an hourly, daily, or weekly basis for example.

Figure 6:
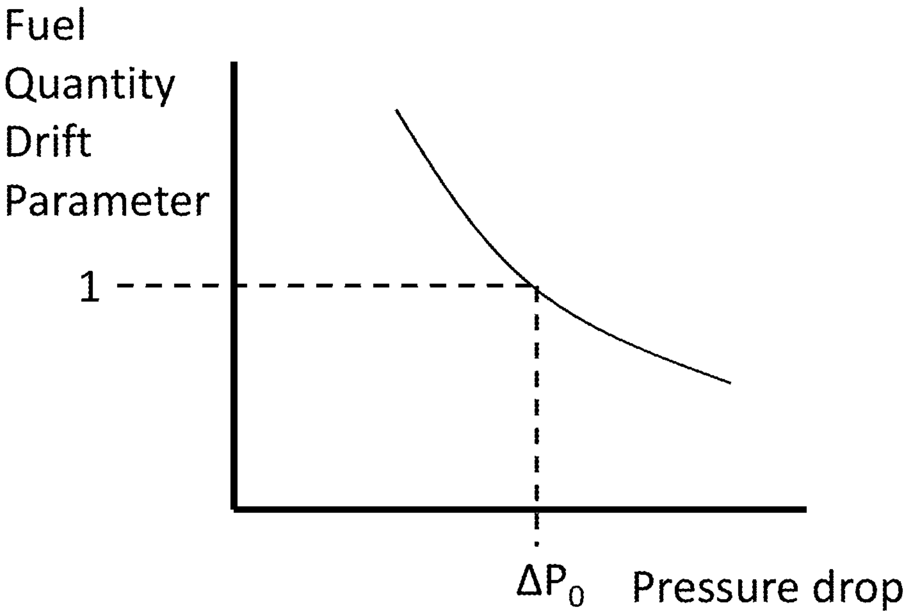
FIG. 6 is a graph showing a relationship between pressure drop and fuel quantity drift parameter for a fuel injector.

FIG. 6 shows a graph of one example of a relationship between the pressure drop and fuel quantity drift parameter which may be used by the controller to determine the fuel quantity drift parameter. As shown in FIG. 6, for the primary fuel injector 20 the controller is provided with an expected pressure drop $\Delta P_0$ which has a fuel quantity drift parameter of 1 associated with it. The expected pressure drop $\Delta P_0$ may be determined by the controller 12 based on the expected fuel quantity to be delivered. As such, when the primary fuel injector 20 and the internal combustion engine 1 is operating under normal conditions, it is expected the pressure drop calculated from the sensor data is about equal to $\Delta P_0$.

According to the example relationship, in the event that the primary fuel injector 20 becomes partially blocked (e.g. due to coking), it may be expected that the fuel pressure drop per injection cycle may decrease in magnitude, resulting in a lower than expected amount of fuel being injected. To compensate for this, the fuel quantity drift parameter determined by the controller may increase above 1, as shown in FIG. 6.

Alternatively, in some cases, the primary fuel injector 20 may deliver slightly more fuel than expected, for example due to wear of the primary fuel injector 20 over time. In such cases the pressure drop may be greater than the expected value $\Delta P_0$. As shown in FIG. 6, the fuel quantity drift parameter determined by the controller may be below 1 in such cases.

In step 103, the controller 14 adjusts a fuel quantity delivered by the primary fuel injector and each secondary fuel injector based on the fuel quantity drift parameter. For example, as shown in FIG. 6, the controller may be configured to adjust a fuel quantity by each of the primary and secondary fuel injectors based on the fuel quantity drift parameter. For example, in some embodiments, the controller 14 may be configured to adjust a fuel injection time (an energisation period of each fuel injector) by a percentage based on the fuel quantity drift parameter in order to compensate for drift in the behaviour of the primary fuel injector 20.

Figure 7:
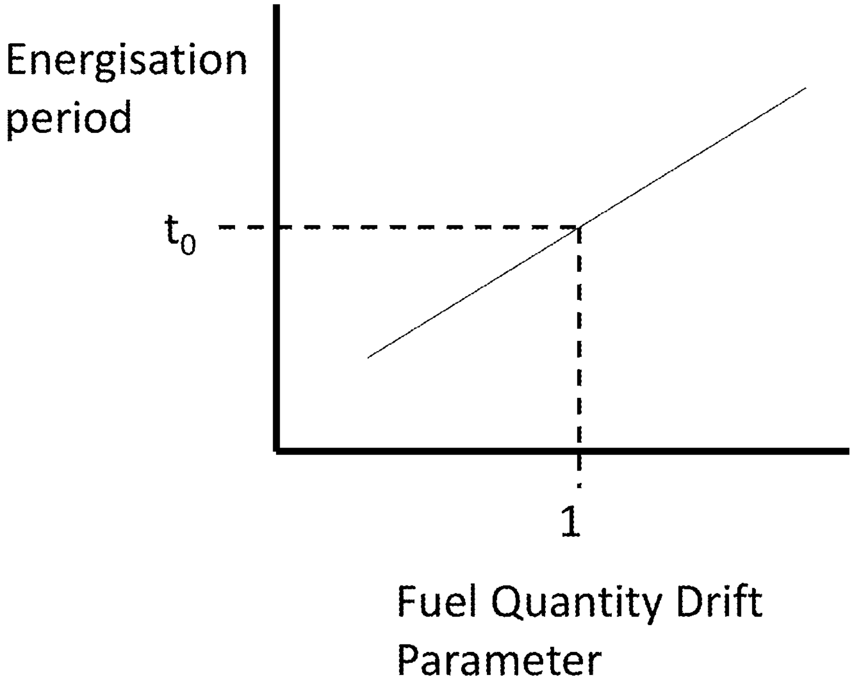
FIG. 7 is a graph showing a relationship between fuel quantity drift parameter and energisation period for a fuel injector.

For example, as shown in FIG. 7, the fuel quantity drift parameter may be used to adjust an energisation period for each fuel injector. As shown in FIG. 7, each of the primary and the secondary fuel injectors 20, 30 may have an expected energisation period to associated with them. Where the fuel quantity drift parameter differs from 1, the energisation period may vary according to a specified relationship, for example as shown in FIG. 7. In some embodiments, the relationship may be defined by way of one or more look-up tables. It will be appreciated that while the relationship shown herein is a linear relationship, in other embodiments a non-linear relationship may be defined. In some embodiments, the relationship may take into account other parameters, for example as discussed in more detail below.

Figure 8:
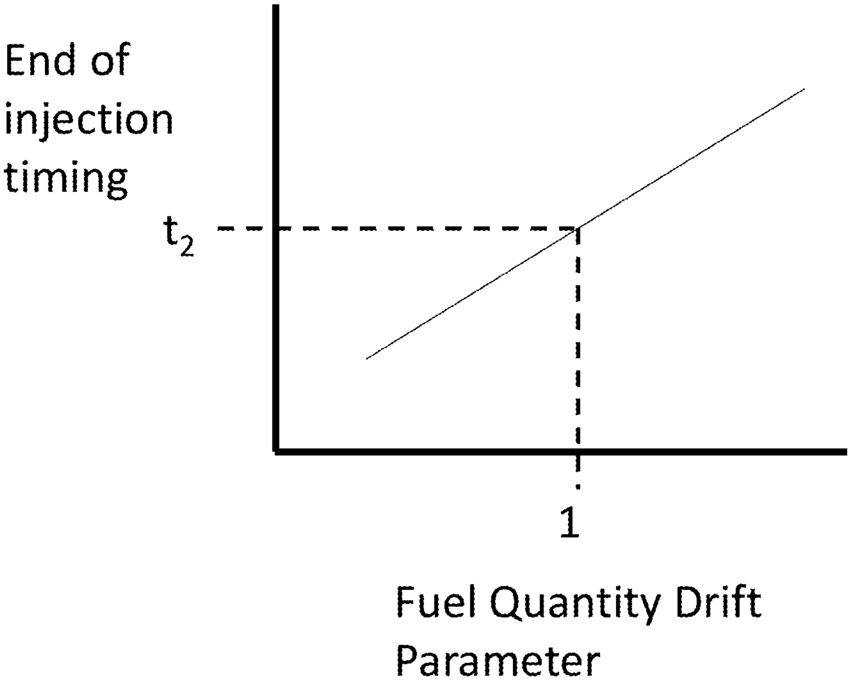
FIG. 8 is a graph showing a relationship between fuel quantity drift parameter and end of injection timing period for a fuel injector.

In some embodiments, the controller may be configured to adjust a fuel quantity delivered by the primary fuel injector and each secondary injector by adjusting a start of injection timing and/or an end of injection timing for each fuel injector based on the fuel quantity drift parameter. For example, as shown in FIG. 8, an end of injection timing may be adjusted based on the fuel quantity drift parameter.

In some embodiments of the disclosure, the primary and secondary fuel injectors 20, 30 may be provided using fuel injectors which have similar mechanical designs, such that the drift behaviour of the fuel injectors is substantially the same. In some embodiments, the drift behaviour of some of the fuel injectors may be different from other fuel injectors of the fuel injection system. For example fuel injectors may have different drift characteristics due to one or more of: cylinder-to-cylinder gas temperature variation, coking at different rates, cylinder-to-cylinder breathing differences, Exhaust Gas Recirculation concentration, coolant distribution, and injector mechanical variations etc. As such, in one embodiment a fuel injection system 10 may be provided with a primary fuel injector 20, a first secondary fuel injector 30*a*, and a second secondary fuel injector 30*b*, wherein each of the fuel injectors 20, 30*a*, 30*b* has a different drift behaviour. For example, in one embodiment, the first secondary fuel injectors 30*a* may have a first drift rate corresponding to e.g. a first coking rate, while second secondary fuel injectors 30*b* may have a second drift rate corresponding to e.g. a second coking rate which is different to the first drift rate/first coking rate.

While this example discusses a first secondary fuel injector 30*a* and a second secondary fuel injector 30*b*, it will be appreciated that the following example may be equally applied to different fuel injections performed by the same fuel injector 20, 30 as part of a multi-shot engine cycle. That is to say, a first weight may be associated with a first injection of an engine cycle and a second weight may be associated with the second injection of the engine cycle and so on. It will also be appreciated that in some embodiments each fuel injector 20, 30 may have an associated weight, such that the drift of each fuel injector may be individually weighted/controlled.

In order to compensate for such effects, the controller may be configured to adjust the fuel quantities delivered by each the fuel injectors 20, 30*a*, 30*b* based on the fuel quantity drift parameter and a weight associated with the respective fuel injector 20, 30*a*, 30*b*. As such, the controller 12 may adjust a fuel quantity delivered by the first secondary fuel injector 30*a* based on the fuel quantity drift parameter and a first weight associated $w_1$ with the first secondary fuel injector 30*a*. The controller may also adjust a fuel quantity delivered by the second secondary fuel injector 30*b* based on the fuel quantity drift parameter and a second weight $w_2$ associated with the second secondary fuel injector 30*b*. The controller may also adjust a fuel quantity delivered by the primary secondary fuel injector 20 based on the fuel quantity drift parameter and a primary weight $w_p$ associated with the primary fuel injector 20. For example, based on the example described above, the controller 14 may be configured to adjust a fuel quantity delivered by the first secondary fuel injector based on the fuel quantity drift parameter and a first weight associated with e.g. the first coking rate. The controller may also be configured to adjust a fuel quantity delivered by the second secondary fuel injector based on the fuel quantity drift parameter and a second weight associated with the e.g. the second coking rate.

Figure 9:
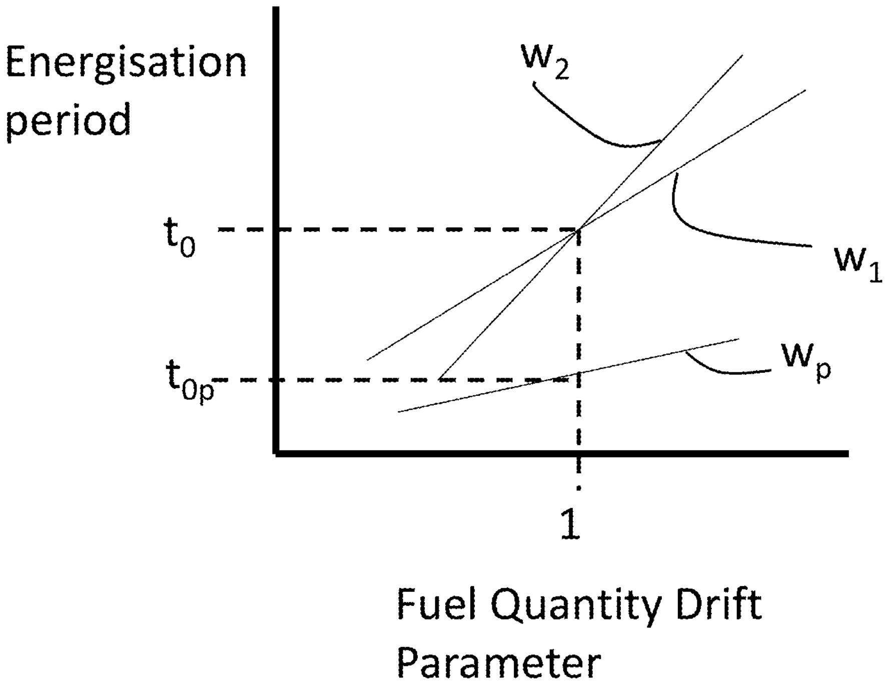
FIG. 9 is a graph showing a relationship between fuel quantity drift parameter and energisation period for a plurality of fuel injectors having different weights.

By way of example, FIG. 9 shows an example of a relationship between energisation period and fuel quantity drift parameter for the fuel injectors 20, 30*a*, 30*b*. As shown in FIG. 9, the first secondary fuel injector 30*a* and secondary fuel injectors 30*b* each have a linear relationship between energisation period and fuel quantity drift parameter. The different weights $w_1$, $w_2$ are reflected in FIG. 9 by the different gradients of the graphs. As shown in FIG. 9, the fuel injection system may also compensate for fuel injectors having different (nominal) energisation periods. Thus, as shown in FIG. 9, the primary fuel injector 20 has a different nominal energisation period to the secondary fuel injectors 30*a*, 30*b*. Any difference in performance/drift of the fuel injectors may be compensated for by way of a weighting ($w_p$) as shown in FIG. 9.

Thus, it will be appreciated that the weighting may be applied to different fuel injectors forming part of the fuel injection system. Therefore, a fuel quantity drift parameter determined from a primary fuel injector may be used to compensate for drift in a plurality of fuel injectors. In particular, fuel injectors not incorporating any sensing capabilities maybe compensated for. Such compensation techniques may be particularly applicable to fuel injection systems where it is challenging to incorporate sensing technology into all of the fuel injectors.

In some embodiments, the controller 10 may utilise additional information from the internal combustion engine in order to determine the fuel quantity drift parameter. For example, in some embodiments the fuel injection system 10 may further comprise a cylinder sensor (not shown) coupled to a cylinder (not shown) of the internal combustion engine 1 associated with the primary fuel injector 20. The cylinder sensor may be configured to sense a cylinder pressure and/or a combustion timing of the cylinder and to provide data indicative of said parameters to the controller 12. The controller 12 may be configured to receive data indicative of the cylinder pressure and/or combustion timing, and to determine a fuel quantity drift parameter over a plurality of fuel injection cycles based on the data indicative of the fuel pressure value and the data indicative of the cylinder pressure and/or combustion timing. For example, the change in the cylinder pressure (similar to the change in fuel pressure discussed above with reference to FIG. 5) with each injection event may be indicative of the fuel quantity delivered with the injection event. In some embodiments, the cylinder pressure data may be used to determine an Indicated Mean Effective Pressure (IMEP) for the cylinder to which the cylinder sensor is connected. IMEP may be used to correlate with, or validate the determination of the actual amount of fuel quantity delivered from the sensor 28. As such, the cylinder pressure may be used to improve the accuracy of the determination of the actual amount of fuel quantity delivered with each injection event, and thus whether an adjustment to the fuel quantity drift parameter is required. Similarly, combustion timings may be used to infer whether any adjustment should be made to the start and/or end of injection timings.

In addition to the fuel injection system 10 provided above, it will be appreciated that the sensor 28 and controller 12 may be retrofitted to an existing internal combustion engine comprising a fuel injection system. The sensor 28 may be fitted to the fuel pipe of one fuel injector (thereby designating it is primary fuel injector). The controller 12 may be provided in addition to an existing ECU, or an existing ECU updated with a computer program product according to this disclosure, causing the existing ECU to operate as a controller 12.

INDUSTRIAL APPLICABILITY

According to this disclosure, a fuel injection system, a kit of parts, a method of controlling a fuel injection system, a computer program product, and a computer readable storage medium are provided.

According to embodiments of this disclosure, the fuel quantity delivered by each of the primary and secondary fuel injectors 20, 30 of a fuel injection system 10 may be adjusted over time in order to compensate for any drift in the fuel injectors 20, 30. The present inventors have realised that in order to accurately detect drift in the fuel injectors 20, 30, it is important to have a sensor 28 which is configured to detect a pressure of the fuel being injected by the primary fuel injector 20 during the fuel injection cycle. It will be appreciated that providing each fuel injector 20, 30 of an internal combustion engine 1 with one or more dedicated sensors increases the cost and complexity of the fuel injection system 10. Furthermore, the inventors have realised that the long-term drift of the fuel injectors 20, 30 of an internal combustion engine 1 generally follow a similar trend. In view of this, the fuel injection systems 10 of this disclosure utilise a sensor 28 which is coupled to a primary fuel injector 20, while the secondary fuel injectors 30 may not be provided with such sensors 28. As such, the fuel injection systems 10 of this disclosure provide additional sensing functionality on one fuel injector 20 in order to determine a fuel drift parameter which can be applied to all the fuel injectors 20, 30 of the fuel injection system 10.

Thus, the fuel injection system 10 of this disclosure is particularly effective at addressing the long-term drift in fuel injection performance of a fuel injection system. By way of example, for an internal combustion engine 1 having an expected lifetime of the order of 10,000 hours at an average speed in the range of 1500-2500 revolutions per minute (rpm), it may be expected that each fuel injector 20, 30 may perform about 1-2 billion injection events. Over such timescales, it is to be expected that the behaviour of the fuel injectors 20, 30 may drift. The fuel injection system 10 according to this disclosure aims to compensate for such drift. By compensating for this drift the long-term one or more internal combustion engine characteristics (e.g. performance, durability, emissions etc) may be improved.

In some embodiments, it will be appreciated that a weighting may be applied to the relationship between fuel quantity delivered and the fuel quantity drift parameter for different fuel injectors 20, 30*a*, 30*b* forming part of the fuel injection system 10. Thus, a fuel quantity drift parameter determined from a primary fuel injector 20 may be used to compensate for drift in a plurality of fuel injectors. In particular, fuel injectors not incorporating any sensing capabilities may be compensated for. Such compensation techniques are particularly applicable to fuel injection systems where it is challenging to incorporate sensing technology into all of the fuel injectors. The weighting may also be applicable to fuel injectors 30*a*, 30*b* having different drift rates (e.g. due to different coking rates), or to different injections performed by a given fuel injector 30*a*, within an engine cycle.

The fuel injection systems 10 of this disclosure may be provided as part of an internal combustion engine 1. The internal combustion engine 1 may be provided a part of a machine, for example a vehicle or a generator. In particular, the internal combustion engine may be provided as part of a work vehicle such as an excavator, loader, telehandler, tractor and the like. The internal combustion engine 1 according to this disclosure may be a diesel internal combustion engine, or may be an internal combustion engine running on an alternative fuel, for example ammonia.

The invention claimed is:

1. A fuel injection system for an internal combustion engine comprising:

a primary fuel injector configured to inject fuel into an ignition chamber of the internal combustion engine for a plurality of injection cycles of the primary fuel injector;

a sensor coupled to the primary fuel injector, the sensor configured detect a pressure drop of the fuel upstream of the primary fuel injector upon each injection cycle of the primary fuel injector;

at least one secondary fuel injector configured to inject fuel into a respective ignition chamber of the internal combustion engine;

a controller configured to:

receive data indicative of changes in the pressure drop for the plurality of injection cycles for only the primary fuel injector;

determine a fuel quantity drift parameter based on the data indicative of the changes in the pressure drop over the plurality of injection cycles of the primary fuel injector;

determine a secondary fuel quantity drift parameter for the at least one secondary fuel injector based at least in part on the changes in the pressure drop over the plurality of injection cycles of the primary fuel injector;

adjust a fuel quantity delivered by the primary fuel injector and each secondary fuel injector based on the fuel quantity drift parameter and the secondary fuel quantity drift parameter;

wherein the controller is configured to calculate a moving average based on the data indicative of the changes in the pressure drop over the plurality of injection cycles for the primary fuel injector;

wherein the controller is configured to determine the fuel quantity drift parameter based on the moving average; and wherein the controller is configured to determine the secondary fuel quantity drift parameter for the at least one secondary fuel injector based at least in part on the moving average.

2. A fuel injection system according to claim 1, wherein the controller is configured to adjust a fuel quantity delivered by the primary fuel injector and each secondary injector by adjusting an energisation period for each fuel injector based on the fuel quantity drift parameter.

3. A fuel injection system according to claim 1, wherein the controller is configured to adjust a fuel quantity delivered by the primary fuel injector and each secondary injector by adjusting a start of injection timing and/or an end of injection timing for each fuel injector based on the fuel quantity drift parameter.

4. A fuel injection system according to claim 1, wherein the sensor is integrated with the primary fuel injector.

5. A fuel injection system according to claim 1, wherein the primary fuel injector is connected to a fuel rail of the internal combustion engine by a fuel pipe, wherein the sensor is configured to sense a fuel pressure of the fuel in the fuel pipe.

6. A fuel injection system according to claim 1, wherein the fuel injection system comprises a first secondary fuel injector and a second secondary fuel injector, wherein the controller is configured to:

adjust a fuel quantity delivered by the first secondary fuel injector based on the fuel quantity drift parameter and a first weight associated with the first secondary fuel injector; and adjust a fuel quantity delivered by the second secondary fuel injector based on the fuel quantity drift parameter and a second weight associated with the second secondary fuel injector.

7. A fuel injection system according to claim 1, wherein the fuel injection system further comprises a cylinder sensor coupled to a cylinder of the internal combustion engine associated with the primary fuel injector, the cylinder sensor configured to sense a cylinder pressure and/or a combustion timing of the cylinder, and the controller is configured to receive data indicative of the cylinder pressure and/or combustion timing, and to determine the fuel quantity drift parameter over the plurality of injection cycles based on the data indicative of changes in the pressure drop for the plurality of injection cycles for and the data indicative of the cylinder pressure and/or combustion timing.

8. A fuel injection system according to claim 1, wherein the controller is configured to cause the primary fuel injector and the at least one secondary fuel injector to perform a first fuel injection cycle and a second fuel injection cycle for each cycle of the internal combustion engine.

9. A fuel injection system according to claim 8, wherein the controller is configured to adjust a fuel quantity delivered by the primary fuel injector and the at least one secondary fuel injector based on the fuel quantity drift parameter and a first weight associated with the first fuel injection cycle; and adjust a fuel quantity delivered by the primary fuel injector and the at least one secondary fuel injector based on the fuel quantity drift parameter and a second weight associated with the second fuel injection cycle.

10. A fuel injection system according to claim 1, wherein the fuel injection system is provided as part of diesel internal combustion engine, or an ammonia internal combustion engine.

11. A computer program product configured to use the fuel injection system of claim 1.

12. A computer-readable storage medium having the computer program product of claim 11 stored thereon.

13. A kit of parts for a fuel injection system of an internal combustion engine comprising a primary fuel injector and at least one secondary fuel injector, the kit of parts comprising:

a sensor configured to be coupled to a primary fuel injector of the internal combustion engine, the sensor configured to detect a pressure drop of fuel upstream of the primary fuel injector upon each injection cycle of the primary fuel injector;

a controller for controlling the fuel injection system, the controller configured to:

receive data indicative of a changes in the pressure drop for a plurality of injection cycles for only the primary fuel injector;

determine a fuel quantity drift parameter over the plurality of injection cycles based on the data indicative of the changes in the pressure drop over the plurality of injection cycles of the primary fuel injector;

determine a secondary fuel quantity drift parameter for the at least one secondary fuel injector based at least in part on the changes in the pressure drop over the plurality of injection cycles of the primary fuel injector; and adjust a fuel quantity delivered by the primary fuel injector and each secondary fuel injector based on the fuel quantity drift parameter and the secondary fuel quantity drift parameter;

wherein the controller is configured to calculate a moving average based on the data indicative of the changes in the pressure drop over the plurality of injection cycles for the primary fuel injector;

wherein the controller is configured to determine the fuel quantity drift parameter based on the moving average; and wherein the controller is configured to determine the secondary fuel quantity drift parameter for the at least one secondary fuel injector based at least in part on the moving average.

14. A kit of parts according to claim 13, wherein the sensor is provided as part of a primary fuel injector for the internal combustion engine, or as part of fuel pipe configured to supply fuel to the primary fuel injector of the internal combustion engine.

15. A computer program product configured to use the kit of parts of claim 13 when installed on an internal combustion engine.

16. A method of controlling a fuel injection system of an internal combustion engine comprising:

injecting fuel into an ignition chamber of the internal combustion engine using a primary fuel injector for a plurality of injection cycles of the primary fuel injector, detecting, via a sensor coupled to the primary fuel injector, a pressure drop of the fuel upstream of the primary fuel injector upon each injection cycle of the primary fuel injector;

injecting fuel into a respective ignition chamber of the internal combustion engine using at least one secondary fuel injector;

receiving data at a controller, the data indicative of changes in the pressure drop for the plurality of injection cycles for only the primary fuel injector;

calculating a moving average based on the data indicative of the changes in the pressure drop over the plurality of injection cycles for the primary fuel injector;

determining a fuel quantity drift parameter based on the moving average;

determining a secondary fuel quantity drift parameter for the at least one secondary fuel injector based at least in part on the moving average; and adjusting a fuel quantity delivered by the primary fuel injector and each secondary fuel injector based on the fuel quantity drift parameter and the secondary fuel quantity drift parameter.

17. A computer program product configured to perform the method of claim 16.

* * * * *